United States Patent [19]

Igusa et al.

[11] Patent Number: 4,683,666
[45] Date of Patent: Aug. 4, 1987

[54] COFFEE ROASTER

[75] Inventors: Masaru Igusa, Takasaki; Masayoshi Nakai, Isesaki, both of Japan

[73] Assignee: Sanden Corporation, Gunma, Japan

[21] Appl. No.: 832,301

[22] Filed: Feb. 24, 1986

[30] Foreign Application Priority Data

Feb. 23, 1985 [JP] Japan .................................. 60-34855
Mar. 1, 1985 [JP] Japan .................................. 60-38787

[51] Int. Cl.⁴ .............................................. E26B 11/04
[52] U.S. Cl. .......................................... 34/67; 34/133; 34/225; 34/233
[58] Field of Search ................ 34/133, 179, 181, 182, 34/183, 225, 233, 62, 67; 99/286

[56] References Cited

U.S. PATENT DOCUMENTS

| | | | |
|---|---|---|---|
| 2,325,684 | 8/1943 | Kayden | 99/286 |
| 4,196,342 | 4/1980 | Chailloux | 99/286 |
| 4,271,603 | 6/1981 | Moore | 99/286 |
| 4,325,191 | 4/1982 | Kjmagai et al. | 34/133 |

FOREIGN PATENT DOCUMENTS

528721 9/1929 Fed. Rep. of Germany ........ 34/181

Primary Examiner—Albert J. Makay
Assistant Examiner—David W. Westphal
Attorney, Agent, or Firm—Banner, Birch, McKie & Beckett

[57] ABSTRACT

A coffee roasting apparatus which includes a coffee roaster device which comprises a cylindrical container formed preferably of glass material, a cylindrical drum rotatably extending within the center portion of container, and a heater element disposed within the drum. The drum is formed of wire cloth and driven by a motor. Coffee directly receives radiation heat through the drum. Also, the roaster device is rotatably supported in a housing, which is provided with a cooling space which enables the apparatus to automatically proceed to the discharge of the roasted coffee beans. The interior of the roaster device and the cooling space are connected by an open air circulating pathway. Therefore, the cooling of the roasted coffee beans and the interior of roaster device are separately accomplished with a single air pathway.

5 Claims, 12 Drawing Figures

COFFEE ROASTER

TECHNICAL FIELD

This invention relates to a coffee roaster, and more particularly, to an improved small size coffee roaster.

BACKGROUND OF THE INVENTION

A hot blast method and a heat radiation method are two current methods of roasting coffee. The hot blast method is easily utilized in coffee roasters such as shown in U.S. Pat. Nos. 4,325,191 and 4,271,603. However, the hot blast method produces coffee which is sour and does not smell, or taste, like real coffee. On the other hand, while the heat radiation method maintains the smell and flavor of coffee, the construction of the roaster for the heat radiation method is complicated. Additionally, the heat radiation method takes a long time to roast the coffee.

Small size coffee roasters normally use a rotating roasting drum system, with the drum disposed in a housing. Therefore, as shown in FIG. 1, a drum 1 is formed of wire cloth and has an open end covered by a glass plate 2. Drum 1 is rotated by a motor 3. Coffee beans in drum 1 are heated by heater 4 disposed along an outer peripheral portion of drum 1. Alternatively, a drum 1 may be formed of heat resistant glass with wire cloth along its inner surface, as shown in FIG. 2. In these coffee roaster structures, the radiation heat from the heater element cannot be used effectively because the heater is disposed outside the roasting drum so that heat radiates without contributing to the roasting. To solve this disadvantage, the drum and heater can be sealed within the same container. However, the outer configuration of the roaster is increased and the heat efficiency is only somewhat improved.

There are also two types of process for roasting coffee, a continuous roasting process, and a non-continuous roasting process. In the continuous roasting process, the roasting process from roasting to cooling occurs within a single space or area. In this process, the time for the roasting process is relatively long because changing the appropriate temperature from the roasting process to the cooling process takes a long time. During this time, the smell and flavor of the coffee fails.

In the non-continuous roasting process, the roasting portion and cooling portion of the overall process are performed separately, in different areas or portions of the apparatus so that the above-mentioned disadvantage is eliminated. However, the shifting of roasted coffee beans from the roasting device to the cooling portion is generally carried out by hand. Thus, the efficiency and convenience of the roasting process is poor. Also, the cooling process must cool not only the roasted coffee beans, but also the interior of the roasting device so that the roasting process can be repeated soon after one roasting process has finished, since unroasted coffee beans cannot be placed directly in a hot roasting device. Therefore, such roasters are generally provided with two air circulating devices, one to cool down the roasted coffee beans in a cooling bin and the other to cool down the roasting device itself. The cost and size of such roasters thus increases.

SUMMARY OF THE INVENTION

It is a primary object of this invention to provide an improved coffee roaster in which radiation heat is directly supplied to the roasting coffee beans to thereby increase the heating or roasting efficiency.

It is another object of this invention to provide a coffee roaster in which the roasting operation and the cooling operation are separately performed, without diminishing the efficiency or convenience of the roaster.

It is still another object of this invention to provide a coffee roaster which accomplishes the above objects which is compact in size and low in cost.

A coffee roasting apparatus in accordance with the present invention includes a roasting device which comprises a cylindrical container for containing the coffee beans while roasting. A cylindrical drum is rotatably disposed within the center portion of the cylindrical container. The cylindrical drum is provided with a plurality of blades. A heater element is disposed within the cylindrical drum. The cylindrical drum preferably is formed of porous material and rotated by a driving device.

In a preferred embodiment of this invention, the roasting device, as described above, is disposed in an outer housing, which comprises an outer frame and a base portion. The roasting device is rotatably supported on the outer frame. The outer housing defines a cooling space which is below a roasted coffee bean discharge portion. The discharge portion is formed on the outer frame to quickly cool down the roasted coffee beans. An open air circulating path is formed between the cooling space and the interior of the roasting device in the outer housing. In this way, the cooling of the roasted coffee beans and the interior of the roasting device are cooled down by a single cooling device.

Further objects, features and other aspects of this invention will be understood from the detailed description of the preferred embodiments of this invention with reference to the attached drawings which form a further part of the disclosure.

BRIEF DESCRIPTION OF THE DRAWINGS

FIG. 4 is a cross-sectional view of the heater element used in FIG. 3a.

FIG. 5b is a side view of FIG. 5a.

DETAILED DESCRIPTION

Figure 1:
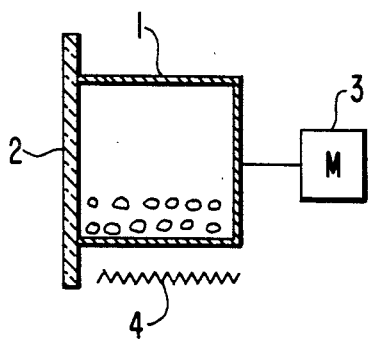
FIGS. 1 and 2 are schematic cross-sectional views of prior art roasting devices.
Figure 2:
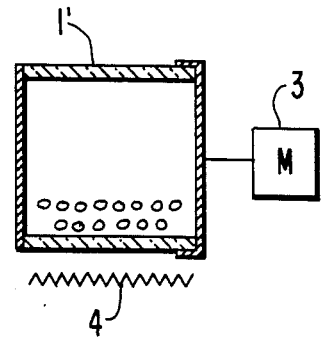
Figure 3A:
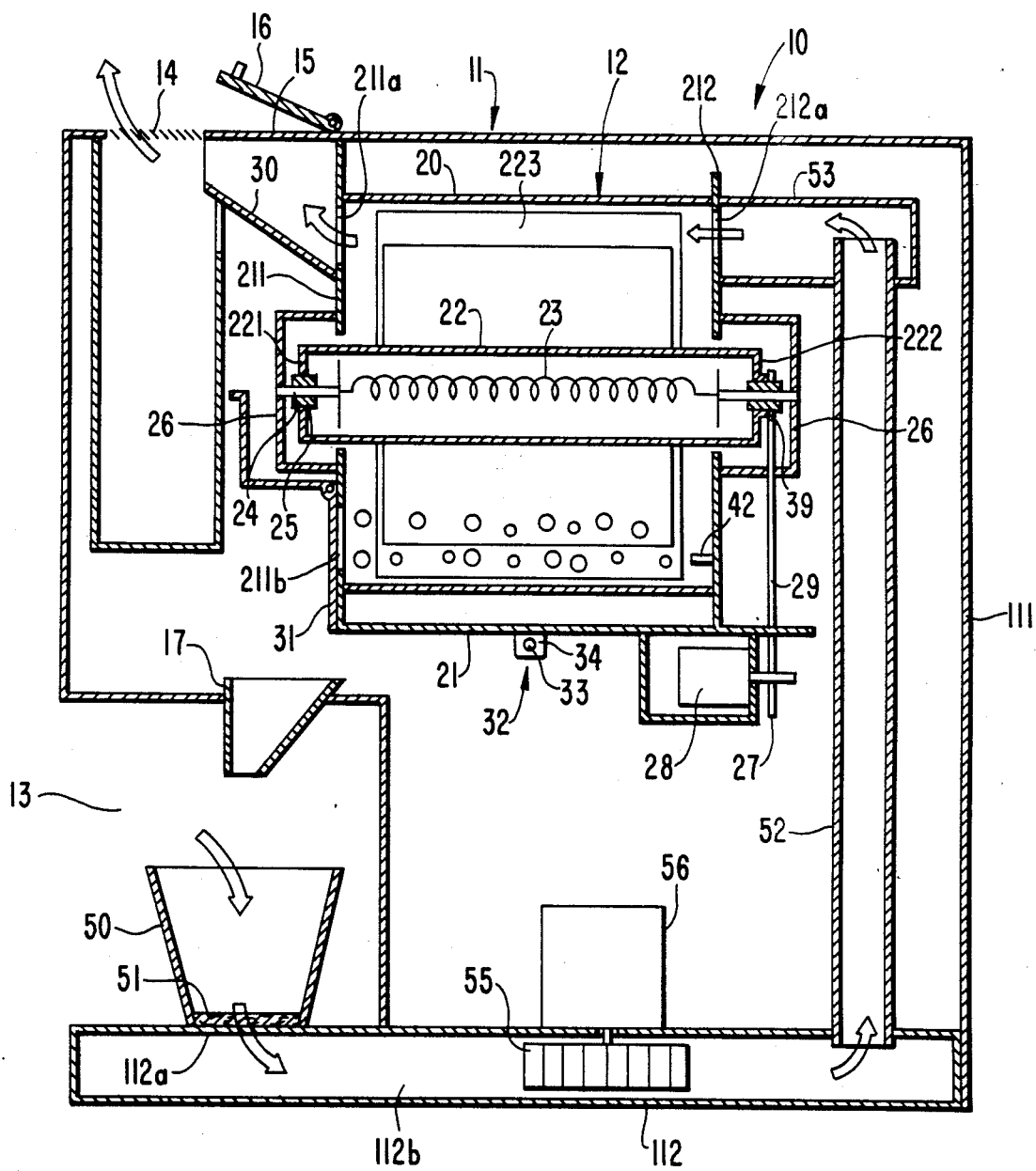
FIG. 3a is a cross-sectional view of the roasting apparatus of the present invention.
Figure 3B:
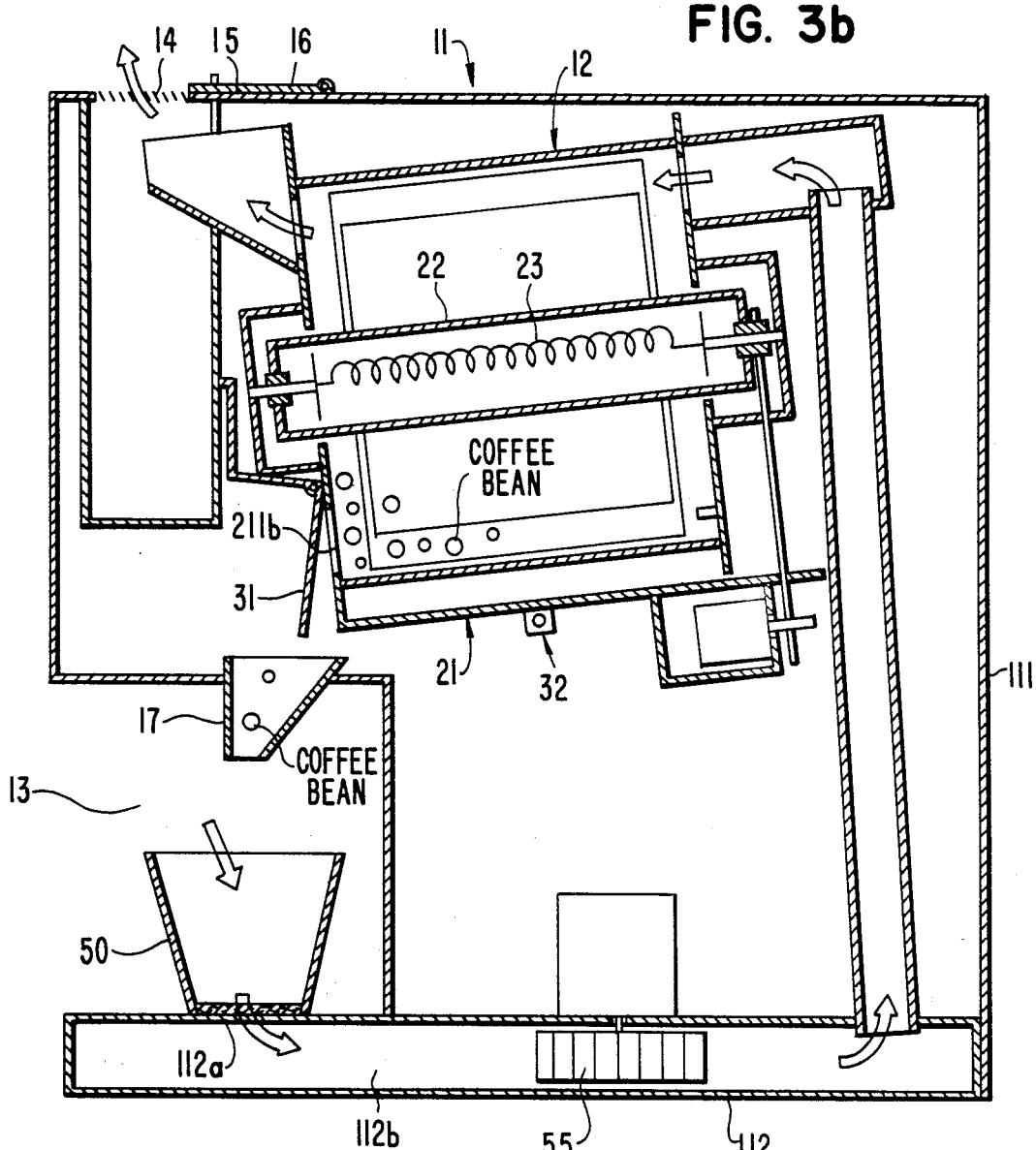
FIG. 3b is a cross-sectional view of the roasting apparatus of FIG. 3a illustrating the discharge operation of roasted coffee bean.
Figure 4:
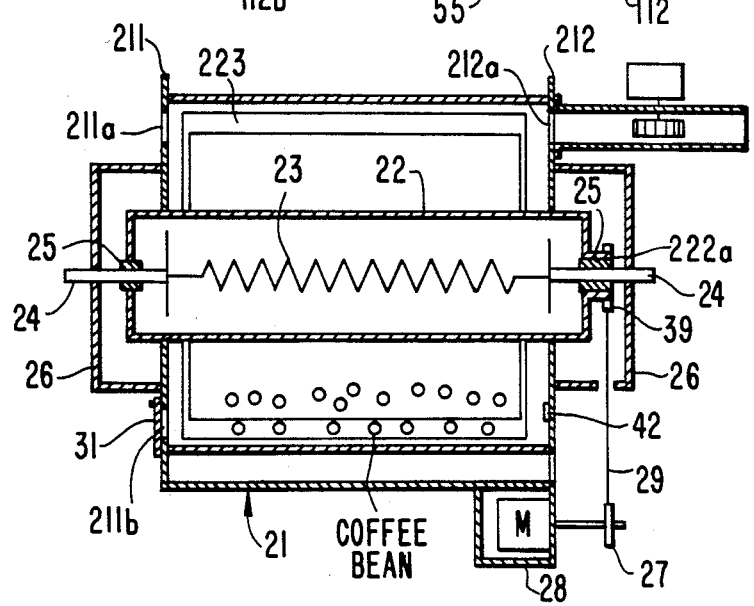

Referring to FIG. 3 and 4, a coffee roasting apparatus 10 according to the present invention is shown. Coffee roasting apparatus 10 has an outer housing 11 in which a roasting device 12 is disposed.

Outer housing 11 comprises an L-shaped outer frame 111 and base portion 112. A cooling space 13 is defined between outer frame 111 and base portion 112. An air outlet hole 14 and coffee bean supply portion 15 are formed on an upper portion of outer frame 111 closely placed to each other. Supply portion 15 is preferably covered by a door 16. Outer frame 111 is also provided with a coffee bean discharge duct 17, opening onto cooling space 13.

Base portion 112 is placed below outer frame 111 and forms an air inlet portion 112a which opens towards discharge duct 17. A cooling container 50 with an open bottom or base portion is disposed on air inlet portion 112a. Wire netting element 51 is disposed on the bottom opening to cover the opening to inlet portion 122C, as shown in FIG. 3a. The interior of base portion 112 functions as an air passageway 112b. An air connecting duct 52 extends vertically within outer frame 111 and connects with the other end of air passageway 112b. The air passed through air passageway 112b and connecting duct 52 is introduced into roasting device 12 through air duct 53. The air introduced into roasting device 12 flows out to the exterior of outer housing 10 through air outlet hole 14. Therefore, an open air circulation pathway is defined by base portion 112, ducts 52, 53, roasting device 12 and outer frame 111. The air circulated within the air circulation pathway is forced by blower 55 which is disposed in air passageway 112b and driven by blower motor 56.

Roasting device 12, which is placed on the upper portion of outer frame 11, comprises a cylindrical container 20 which functions as a roasting drum, a supporting frame 21, and a cylindrical drum 22 in which a heater element 23 is disposed. Cylindrical container 20 is formed of a transparent material with heat resisting characteristic, for example, a glass material. The end openings of container 20 are covered by end plates 211, 212 of supporting frame 21, respectively. Cylindrical drum 22, which is formed of a porous material, for example, wire cloth extends horizontally within cylindrical container 20 and outwardly from end plate 211, 212. A plurality of blades 223 are disposed on an outer peripheral surface of drum 22 for rotating together with drum 22 and closely extend against the inner peripheral surface of container 20, as shown in FIGS. 3 and 4.

During the heating or roasting operation, a large quantity of smoke and/or smell may be caused from the coffee beans. As a result of these phenomenon, the inner surface of glass container 20 may become dim or cloudy. One solution to resolve this disadvantage is to form wire cloth drum 22 of an oxide catalyst. The formation of the smoke and/or smell is repressed by chemical reaction between the oxide catalyst and the smoke and/or smell.

Both end openings of drum 22 are covered by end plates 221, 222, each of which is rotatably supported on fixed shaft 24 through bearing 25. Fixed shaft 24 is fixedly supported on supporting frame 26 fastened on an end surface of each of end plates 211, 212. An axial flange is formed on one end surface of end plate 222, and a sprocket 26 is fixed on an outer end portion of the flange. Sprocket 26 is connected with a sprocket 27 fixed on a drive shaft of a driving motor 28 through endless chain 29. Thus, drum 22 is rotatably disposed within container 20.

Coffee beans may be thrown in hole 211a of end plate 211, which also functions as a hot air outlet hole. Coffee bean discharge hole 211b is also formed through end plate 211. An air inlet hole 212a is formed through end plate 212. A coffee bean guiding plate 30 is fixed on end plate 211 to connect the coffee bean supply portion 15 to hole 211a. Discharge hole 211b is closed by rotatable cover plate 31.

Figure 5A:
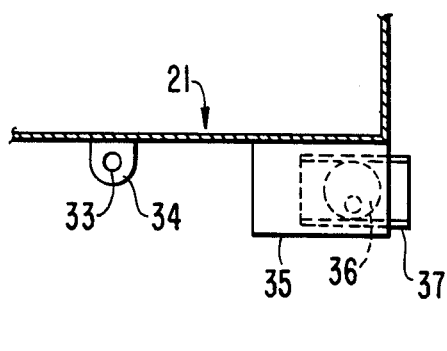
FIG. 5a is a cross-sectional view of the discharge device of the present invention.
Figure 5B:
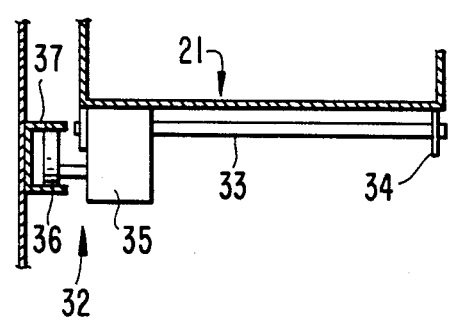
Figure 6A:
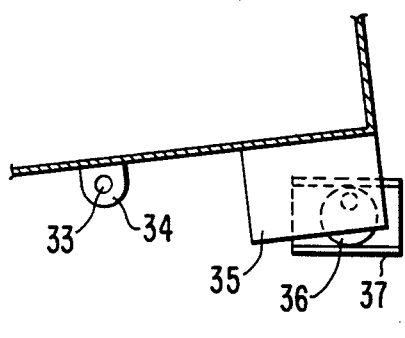
FIGS. 6a and 6b are sectional views illustrating the operation of the discharge device of the present invention.
Figure 6B:
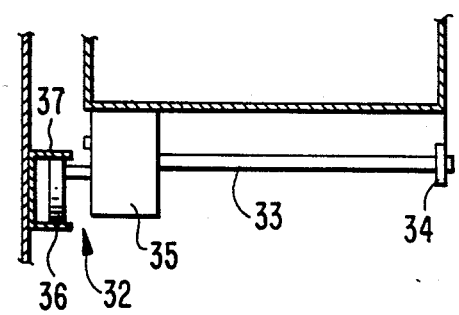

Roasting device 12 is also rotatably supported in outer frame 111 and provided with a discharge device 32. As shown in FIGS. 5 and 6, supporting frame 21 is supported on outer frame 111 by supporting shaft 33 through support bearing element 34 which are disposed on the bottom surface of supporting frame 21 and provided with discharge motor 35 of discharge device 32 at one end side of the bottom surface. Motor 35 is connected with an eccentric cam element 36 which is rotatably supported in cam frame 37 on outer frame 111 through a connecting rod. Thus roasting device 12 can be pivoted about supporting shaft 33 due to operation of discharge device 32. As shown in FIGS. 5a and 5b, roasting device 12 is placed in a horizontal position while the operation of motor 35 is stopped. However, if motor 35 is rotated 180° degrees, (this position is shown in FIGS. 6a and 6b), roasting device 12 is pivoted about shaft 33 and thus container 20 is slanted to discharge the roasted coffee beans.

Figure 7:
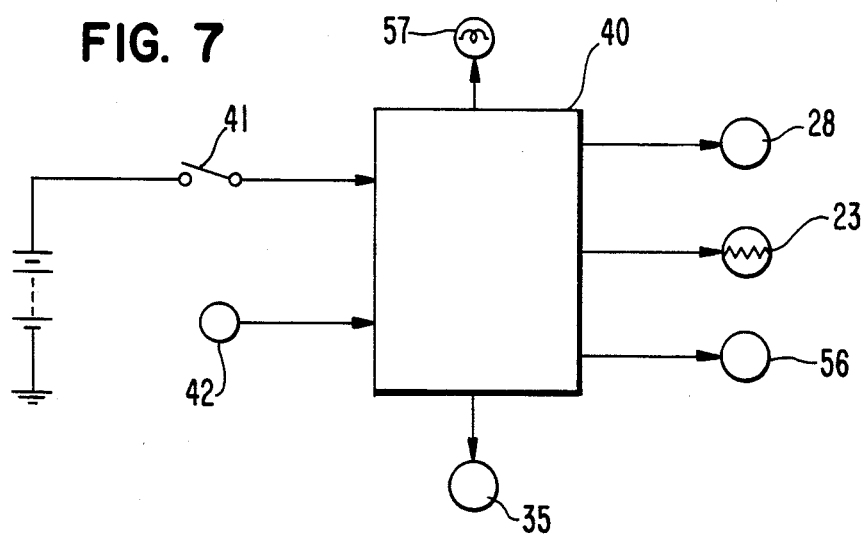
FIG. 7 is an electrical circuit diagram of the roasting control device of the present invention.

Referring to FIG. 7, the control mechanism of the coffee bean roasting device will be described. Controller 40, which controls the operation of the motors, heater element and other elements is connected to an electrical source through a main/preheating switch 41. Controller 40 receives a detecting signal from thermosensor 42 which is disposed in container 20 for detecting the temperature in container 20. Controller 40 is connected with driving motor 28, discharge motor 35, heater element 23, blower motor 56 and display signal 57, and controls the operation of these element by an output signal.

Figure 8:
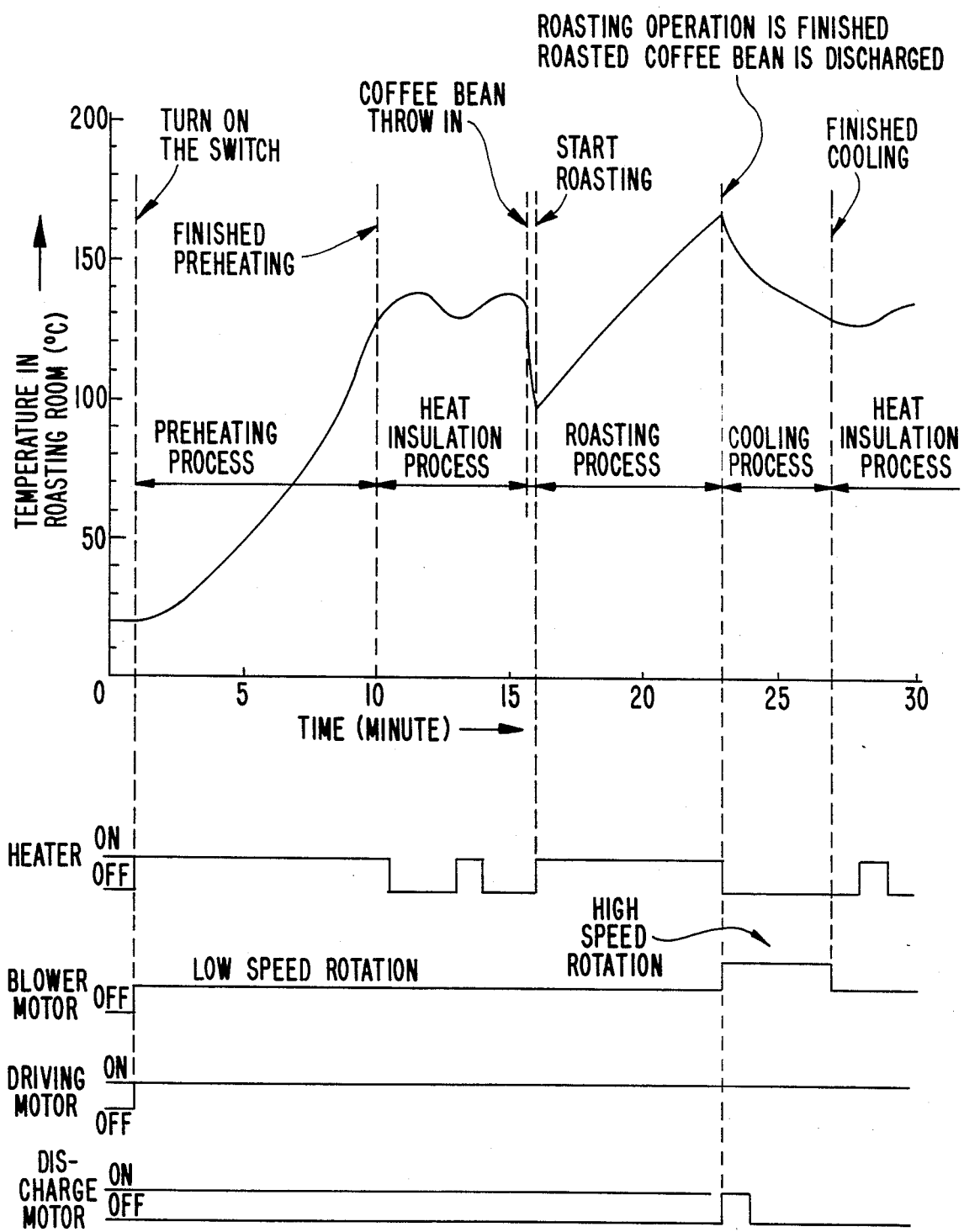
FIG. 8 is a graph illustrating the change of temperature in the roasting device and the operating sequence of various elements of the roasting device.

The roasting process will be described with reference to FIGS. 8 and 9. At normal temperature, for example 20° C., main/preheating switch 41 is closed to start the roasting process (this position is step a in FIG. 9). Controller 40 is accuated to operate blower motor 56 and heater element 23. At this time, the blower motor is rotated at blow speed. Thus the interior of the container is preheated to increase the temperature within. During the preheating temperature, for example 130° C., display signal 57 is flashed and the supply of electric current to heater element 23 is cut by the output signal from controller 40 (this position is steps b and c in FIG. 9). After reaching the predetermined temperature and cutting off the operation of heater element 23, the temperature in the container is maintained at the predetermined range by the operation of controller 40 i.e., controller 40 controls heater element 23 due to changes of temperature which are detected by thermosensor 42 (this position is step d in FIG. 9). In this situation, the roasting apparatus is ready for the roasting operation.

While above conditioned, if coffee beans are thrown into the interior of container 20, the temperature in container 20 is suddenly decreased. Controller 40 detects this situation through thermosenser 42 and compares the temperature with the predetermined temperature, for example 130° C. If the detected temperature is below the predetermined temperature, controller 40 supplies the electric current to heater element 23 to automatically started the roasting operation (this position is step f in FIG. 9). Therefore, the temperature in container 20 is gradually increased, as shown in FIG. 8. Also, wire cloth drum 22 is rotated by the rotating operation of driving motor 28. At the same time, the plurality of blades 223 are rotated following with the rotation of drum 22. Blades 223 stir up the coffee beans disposed in the container 20. Thus, the coffee beans directly receive radiant heat of heater element 23 through drum 22 while rolling within the container 20. As the result of the above roasting operation, the heating efficiency or roasting efficiency of the coffee beans is greatly improved.

Figure 9:
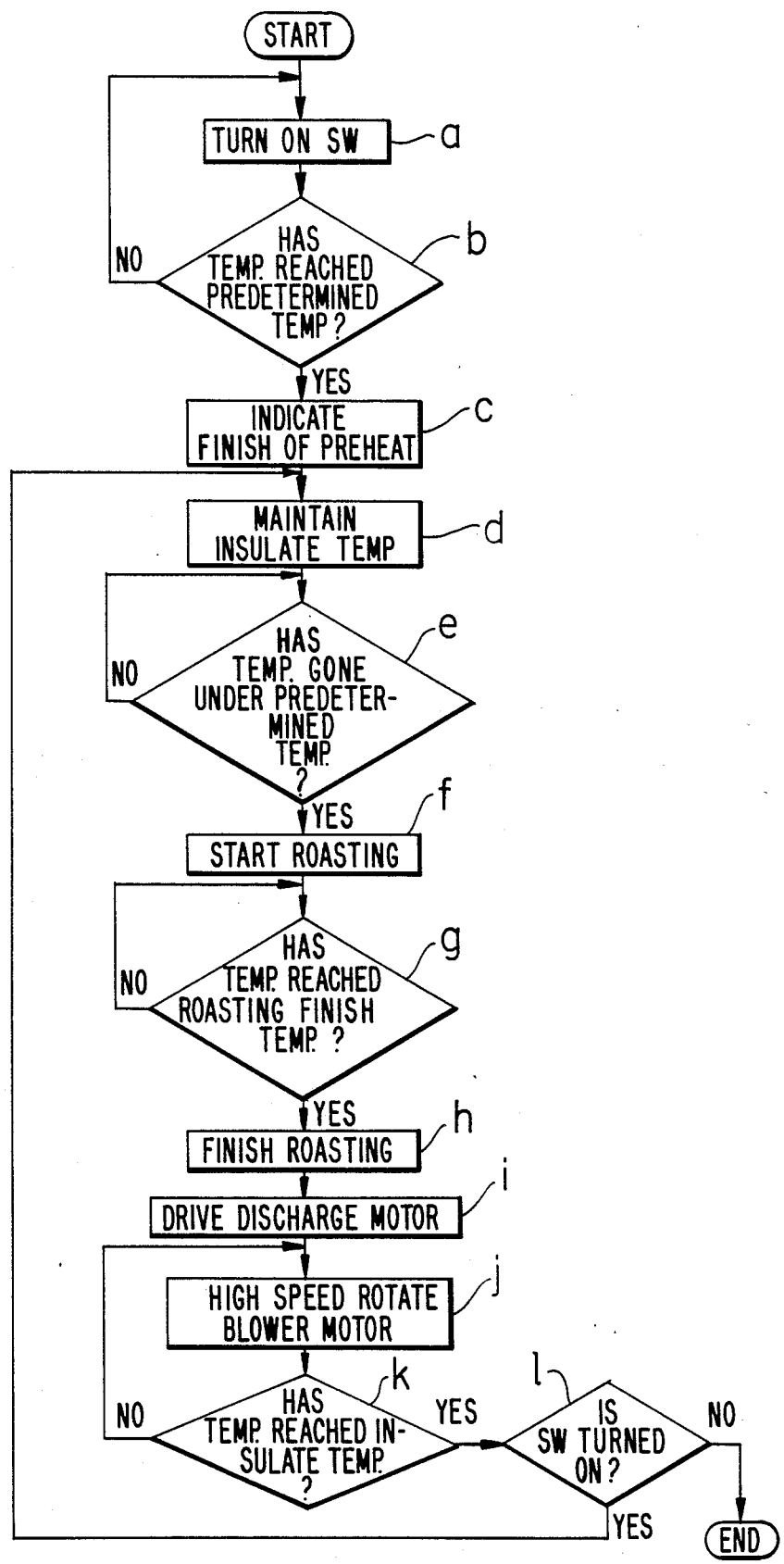
FIG. 9 is a flowchart of the operation of the roasting control device.

After the temperature in container 20 reaches the roasting operation finish temperature, for example 170° C., and controller 40 determines that the temperature in container 20 exceeds this predetermined temperature, the operation of heater element 23 is cut off by the output signal from controller 40 and the roasting operation is finished (this situation is indicated by steps g and h in FIG. 9). At this time, display signal 57 is flashed to indicate that the roasting operation is finished.

After finishing the roasting operation, controller 40 drives the discharge motor 35 within a predetermined time (this position is step I in FIG. 9). Thus, eccentric cam element 36 is rotated 180 degrees to slant the roasting device 12, as shown in FIG. 6a. As a result of slanting roasting device 12, the roasted coffee beans are discharged into cooling container 50 in cooling space 13 through discharge opening 211b and discharge duct 17. As shown in FIG. 3b, cover plate 31 is rotated or pivoted by the slanting or tilting operation to open discharge hole 211b. This discharge operation of the roasted coffee also is promoted by the rotating operation of blades 223. After a predetermined time, discharge motor 35 is stopped and roasting device 12 is returned to its horizontal position by its own weight. Also, at the same time blower motor 56 is driven at high speed to promoted the air circulation (this position is step j in FIG. 9). Therefore, roasted coffee beans placed in cooling container 50 in cooling space 13 are cooled by the circulated air. Also the interior of container 20 is cooled by the inlet air introduced from the air passageway 112b, to thereby quickly lower the temperature in container 20.

While in the cooling process, controller 40 checks the temperature in container 20 through thermosenser 42 to determine whether its interior temperature is below the predetermined preheated temperature (this position is step k in FIG. 9). If the detected temperature is below the predetermined temperature, the roasting process progresses to the next step, such as step 1. In step 1, controller 40 determines whether main/preheating switch 41 is closed. If switch 41 is opened, the roasting process is finished, i.e., no additional beans are to be roasted. If switch 41 is still closed, the operation of controller 40 is returned to step d to maintain the temperature in container 20 and continue the roasting operation.

As stated above, the roasting apparatus according to this invention is provided with a roasting device which includes a cylindrical container and drum containing a heater element. Therefore, radiation heat or convection heat are effectively used to roast the coffee bean. Furthermore, the roasting apparatus comprises a roasting device separate from its cooling space. However, these two parts are connected with one another through an air circulation pathway. Therefore, cooling both the interior of the container and the roasted coffee is accomplished by a single blower device, to thereby reduce the manufacturing cost and size, of the apparatus.

Also, the cooling space is placed below the discharge opening of the coffee bean container. The roasting device is disposed in a housing which can pivot or tilt container 20. Therefore, the roasted coffee beans are automatically discharged into the cooling space, to thereby improve the efficiency of the roasting operation.

This invention has been described in connection with the preferred embodiments, but these embodiments are merely illustrative only, and the invention should not be constructed as limited thereto, particularly in matters of size, shape and arrangement of parts. It should be clear to those skilled in the art that other variations or modifications can be made within the scope of this invention, as interpreted by the broad general meaning of the terms in which the following claims are expressed.

We claim:

1. A self-contained non-continuous, heat radiation rotating drum-type coffee bean roasting apparatus comprising:

a housing assembly;

a coffee bean roasting chamber disposed in said housing, said roasting chamber having coffee bean inlet means for introducing coffee beans into said roasting chamber and coffee bean outlet means for removing coffee beans from said roasting chamber, said coffee bean inlet means being separate and distinct from said coffee bean outlet means;

rotating means for selectively rotating coffee beans within said roasting chamber;

heating means for selectively heating coffee beans within said roasting chamber;

a cooling chamber for cooling roasted coffee beans, said cooling chamber positioned within said housing assembly and below said coffee bean outlet means of said roasting chamber so that roasted coffee beans may be discharged directly from said roasting chamber into said cooling chamber; and air circulation means for selectively circulating heated air to said roasting chamber for roasting the coffee beans or for circulating cooling air to both said roasting chamber and said cooling chamber, said air circulation means comprising an air circulation pathway connecting said roasting chamber and said cooling chamber so that cooling air circulated through said air circulation pathway cools both roasted coffee beans in said cooling chamber and said roasting chamber.

2. A coffee bean roasting apparatus as recited in claim 1 further comprising discharge means for discharging coffee beans from said roasting chamber into said cooling chamber.

3. A coffee bean roasting apparatus as recited in claim 2 wherein said discharge means comprises means for slanting said roasting chamber to thereby discharge coffee beans through said coffee bean outlet means in said roasting chamber to said cooling chamber.

4. A coffee bean roasting device as recited in claim 1 wherein said air circulation pathway comprises an air inlet through said cooling chamber, air passages through said housing assembly and an air outlet from said roasting chamber.

5. A coffee bean roasting device as recited in claim 1 further comprising controller means for controlling the selective operation of said heating means, said rotating means, and said air circulation means.

* * * * *